United States Patent [19]

Holtz

[11] 4,370,159

[45] Jan. 25, 1983

[54] NUTRIENT FOR MUSHROOM GROWTH AND PROCESS FOR PRODUCING SAME

[75] Inventor: R. Barry Holtz, Los Gatos, Calif.

[73] Assignee: Spawn Mate, Inc., San Jose, Calif.

[21] Appl. No.: 251,108

[22] Filed: Apr. 6, 1981

[51] Int. Cl.³ .......................................... C05F 11/00
[52] U.S. Cl. .................................. 71/5; 71/64.11; 47/1.1; 435/254; 435/244
[58] Field of Search ............ 71/5, 23, 904, 903, 71/64.11; 424/22, 20; 47/1.1; 435/254, 244

[56] References Cited

U.S. PATENT DOCUMENTS

| | | | |
|---|---|---|---|
| 1,857,914 | 5/1932 | Keyssner | 71/23 |
| 1,944,788 | 1/1934 | Genz | 71/23 |
| 2,741,551 | 4/1956 | Daline | 71/23 X |
| 3,692,529 | 9/1972 | Rychman | 71/904 X |
| 3,942,969 | 3/1976 | Carroll et al. | 71/5 |
| 4,230,687 | 10/1980 | Sair et al. | 424/22 |

Primary Examiner—Kenneth M. Schor
Attorney, Agent, or Firm—Thomas E. Schatzel

[57] ABSTRACT

The present invention includes an improved nutrient, in particle form, for use in enhancing fungus growth, and particularly directed to edible mushrooms. The nutrient is in the form of conglomerate particles including an irregularly shaped matrix particle and a plurality of enhancer droplets attached to the matrix particle at various recessed attachment positions. The matrix material is denatured protein while the enhance droplets are fatty oil and phospholipid material microencapsulated in a layer of activated protein mixed with mycelium growth stimulators. The present invention further includes a method for preparing nutrient particles for increasing the growth and yield of mushrooms.

9 Claims, 3 Drawing Figures

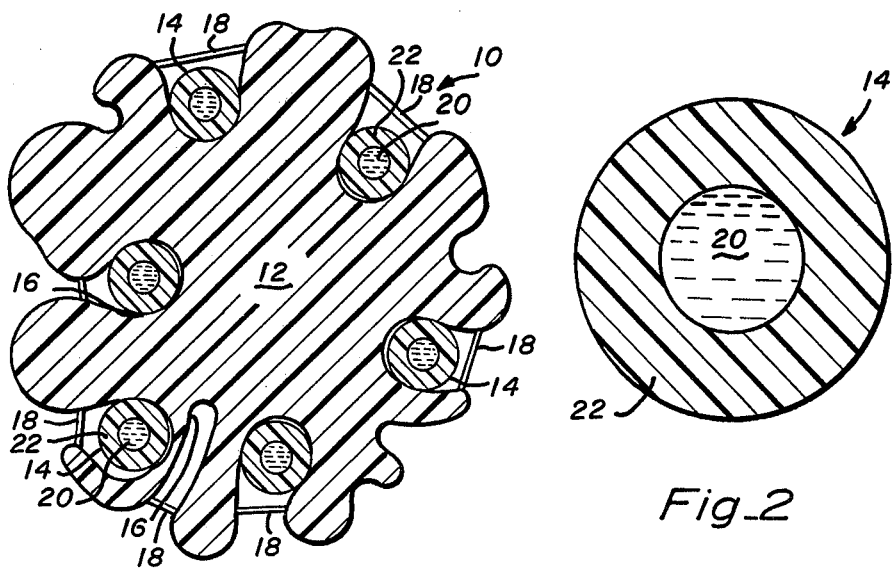
Fig_1
Fig_2
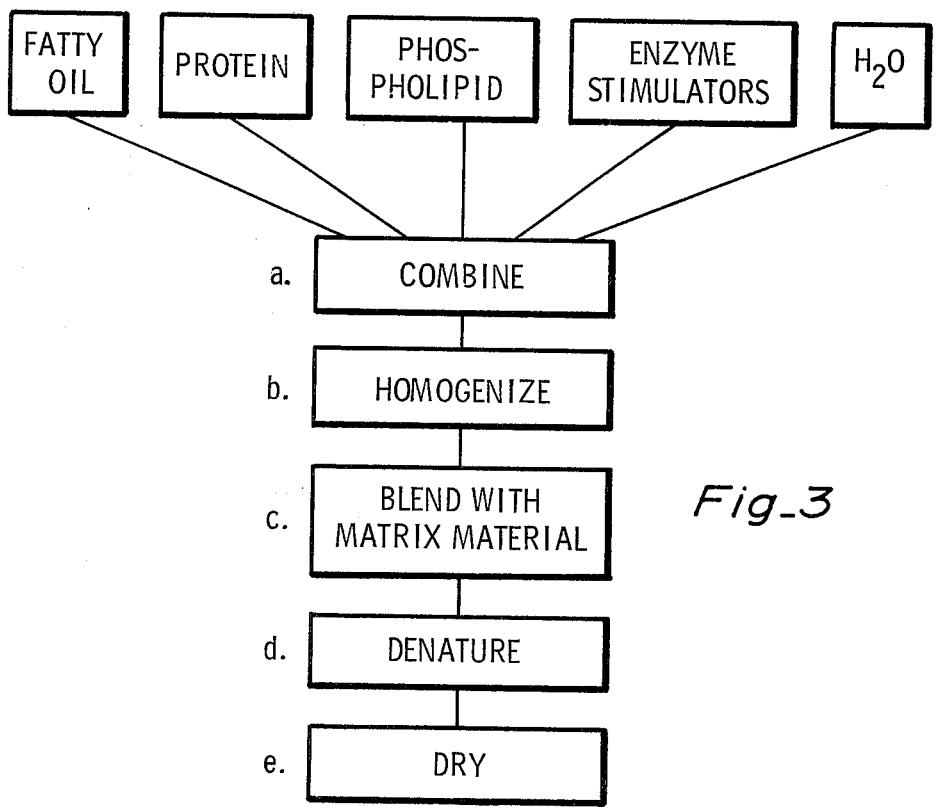
Fig_3

NUTRIENT FOR MUSHROOM GROWTH AND PROCESS FOR PRODUCING SAME

TECHNICAL FIELD

The present invention relates generally to nutritive additives for biological systems and more specifically to growth enhancing and prolonging nutrients for mushroom cultivation, and to methods for producing such nutrients.

BACKGROUND ART

Edible fungi, commonly known as mushrooms, are widely grown throughout the world as a foodstuff. The most commonly grown species in the United States is *Agaricus bisporus*. In the United States alone, hundreds of millions of pounds of this mushroom are produced and eaten annually.

As is the case with any cash agricultural crop, the primary aim is to produce a good quality product in the shortest amount of time with a minimum capital expenditure. Consequently, it is a common object of mushroom growing innovations to increase the quantity of mushrooms produced within a given time period and a given growing area. Attempts to reach these objects have involved altering the environmental conditions in which the mushrooms are grown, improved methods to increase the viability of the mushroom mycelia themselves and by adding various nutrients to the growth medium.

Various United States patents have issued regarding methods of adding nutrients and/or synthetic composts to mushroom cultures with the object of improving growth characteristics. U.S. Pat. No. Re. 22,202, reissued to B. Stoller; U.S. Pat. No. 3,560,190 issued to D. Hughes, et al; and U.S. Pat. No. 3,942,969, issued to A. Carroll, Jr., et al. all relate to the addition of specific additives to either the mushroom spawn or to the compost bed in which the mushroom mycelia are grown. In each case the additives and processes involved are intended to increase the total production of mushrooms and/or decrease the period of time necessary to grow the mushrooms under given conditions.

Scientific articles and publications have also described and treated mushroom growth enhancement and activation methods. These articles include "Stimulation of Yield in the Cultivated Mushroom via Vegetable Oils" L. C. Schisler, APPLIED MICROBIOLOGY, July, 1967, pages 844–850; "The Lipids of Thermophilic Fungi: Lipid Composition Comparisons Between Thermophilic and Mesophilic Fungi" R. O. Mumma, et al, LIPIDS, January, 1970, Volume 5, No. 1, pages 100–103; "Thermophilic Fungi: II." R. O. Mumma, et al, LIPIDS, Vol. 6, No. 6, pages 584–588 (1971); "Thermophilic Fungi: III." R. O. Mumma, et al. LIPIDS, Volume 6, No. 8, pages 589–594 (1971); a masters thesis entitled "Studies on Lipid Metabolism of Agaricus Bisporus (lange) sing. and Compost Lipid Composition" by David E. Smith, Ohio State University (1975); a masters thesis entitled "Effects of Sodium Acetate on Spawn Growth" by Douglas Lehrian, Pennsylvania State University (1975), and "Lipid Metabolism of Mushroom Mycelia" R. Barry Holtz & David E. Smith, MUSHROOM SCIENCE 10, Part I, pages 437–444 (1979).

Various additives and nutrients produced under the prior art have resulted in increased yield and shortened growing time of commercial mushrooms. However, further room for improvement remains in these areas.

A nutrient or other additive which increases the yield of mushroom fruit per given area or shortens the period for a crop to reach fruition is of great commercial value to the mushroom grower. Since mushrooms are grown continuously under artifical conditions they are not subject to climatic variations and may be grown year-round. Thus, a shortening of the time necessary to reach fruition will allow the growing of a greater number of crops per year and effectively increase the production of mushrooms per given area.

BRIEF DESCRIPTION OF THE INVENTION

Accordingly, it is an object of the present invention to provide a nutrient for sustaining and enhancing mushroom growth which increases the yield of edible mushrooms.

It is a further object of the present invention to provide a nutrient in the form of particles which resist breakdown until such time as the mushroom mycelia are sufficiently strong to efficiently utilize the nutrients contained therein.

It is a further object of the present invention to provide a simple and efficient method for preparing nutrient particles for mushroom growth.

Briefly, a preferred embodiment of the present invention includes a nutrient, in particle form, for sustaining and enhancing fungus growth, particularly the growth of edible mushrooms. The nutrient particles include a denatured protein matrix material which has a convoluted surface such that a plurality of recessed attachment positions are formed on that surface. Growth enhancer droplets, including readily available protein material, high energy fatty oil and mycelium growth stimulators, are positioned at several of the recessed attachment positions of the matrix material. The conglomerate nutrient particle is partially denatured such that its tertiary structure inhibits mycelial access to the recessed attachment positions and consequently to the high food value content materials and stimulators of the enhancer droplets. In this manner the enhancer droplets are available only to those mycelia having sufficient maturity and vitality to breakdown and utilize the hydrophobic protein of the matrix particle.

The invention further includes a method for preparing a nutrient particle for mushroom growth. The method includes a series of steps. The first step involves combining fatty oil, protein material, phospholipid material, enzyme stimulator material and water. In the second step the combined materials are homogenized into microencapsulated enhancer droplets. In the third step the microencapsulated enhancer droplets are blended with particulate absorptive protein based matrix material to form a slurry of conglomerate nutrient particles. In the fourth step the slurry is treated in such a manner that the conglomerate particles within the slurry are partially denatured. In the final step, the conglomerate particle slurry is dried to form particles having a predetermined moisture content.

It is an advantage of the present invention that the nutrient particles resist breakdown by the younger mycelia cultures and are thus available as high value foodstuff primarily to the mature and vigorous mycelia which develop near to the time for cropping when it is useful to further stimulate the growth of the mycelia to increase crop output.

It is another advantage of the present invention that the nutrient particles may be added to the mushroom compost prior to or in conjunction with the distribution of the mushroom spawn within the compost, thus eliminating the necessity for disturbing the cultures at a later time.

It is a further advantage of the present invention that the nutient material is primarily made up of a relatively inexpensive by-product material.

It is yet another advantage of the present invention that the method for preparing the nutrient particle is efficient and easily accomplished.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is a cross-sectional view of an idealized conglomerate nutrient particle of the present invention;

FIG. 2 is a cross-sectional view of an idealized enhancer droplet; and

FIG. 3 is a flow chart diagram of a method for preparing a mushroom growth nutrient, in particle form, in accordance with the present invention.

BEST MODE OF CARRYING OUT INVENTION

A preferred embodiment of the present invention is a nutrient for use in growing various fungi, and in particular, edible mushrooms. This nutrient is produced in particle form for distribution throughout the growth medium of the fungus.

An idealized single particle of the nutrient of the present invention is illustrated in cross-section in FIG. 1 and designated by the general reference character 10. It may be seen from this figure that the conglomerate nutrient particle 10 is irregular in shape and includes discrete components. The two major distinct components of the conglomerate component 10 are a single matrix particle 12 and a plurality of enhancer droplets 14 dispersed about the matrix particle 12.

The matrix particle 12, and consequently the conglomerate particle 10, while generally spherical, is irregular in shape. The exterior surface of the matrix particle 12 is convoluted and includes a plurality of recessed attachment positions 16. The recessed attachment positions 16 provide loci at which the enhancer droplets 12 are partially surrounded by the material of the matrix particle 12 and thereby held in position.

The matrix material utilized in the preferred embodiment is a denatured anhydrous soy meal by-product. This material is typically produced from soy bean meal by first extracting the vegetable oil components and then leaching out the water soluble components of the meal. The resulting matrix material is predominantly denatured protein which is not soluble in polar solvents. The irregular, convoluted shape of the matrix particles 12 is a result of the water leaching process. The matrix material is presently commercially available in particle form as Ralston Purina Company "Poly-Soy", Grain Processing Company "DR-100" and Ancher Daniel Midlands (ADM) "AR Soy". Since the matrix material is a residue left over after the more easily utilized components of the soy meal have been removed, it is relatively inexpensive as opposed to other protein concentrate materials.

The extraction and leaching processes render the matrix material somewhat difficult for breakdown by mushroom mycelia. The tertiary protein structure within the matrix material is condensed with strong hydrophobic interaction such that the protein chains are difficult for the mycelia to break down. Consequently, the protein is difficult for the mushroom cells to assimilate. Proteins having this type of tertiary structure and also those having other characteristics which make the proteins difficult for cells to assimilate are known as "denatured proteins".

The matrix particle 12 is initially made up of partially denatured protein material. However, after the enhancer droplets 14 have been captured at the recessed attachment positions 16 of the matrix particle 12 the conglomerate particle 10 is subjected to further denaturing. This further denaturing, accomplished by such means as formaldehyde treatments and application of heat, causes the matrix particle 12 to shrink and further fold in on itself thus more completely enclosing the enhancer droplets 14 within the recessed attachment position 16. The denaturing further causes chemical cross-linking among protein elements in the matrix material. This cross-linking forms a plurality of formyl bridges 18 between adjacent portions of the matrix material. The formyl bridges 18 are illustrated in a higly idealized fashion in FIG. 1. The formyl bridges 18 further act to restrain the enhancer droplets 14 within the matrix particle 12. Since the exterior portion of the enhancer droplets 14 is also predominantly made up of protein material, an amount of cross-linking will take place between that material and the matrix material as well. This futher holds the enhancer droplets 14 in position.

FIG. 2 illustrates, in cross-section, an idealized enhancer droplet 14. As shown, the enhancer particle 14 is a generally spherical particle including a core 20 which is microencapsulated by a protein layer 22. As shown in FIG. 1, the enhancer droplet 14 is small when compared to the matrix particle 12. Furthermore, the average enhancer particle 14 will be reasonably regular and spherical in shape.

The core 20 includes oily materials which are very high in readily available energy for the fungus mycelia. In the preferred embodiment the primary contents of the core 20 are vegetable oil; in particular, soy bean oil and/or cottonseed oil, and a phospholipid material such as lecithin. The fatty oil material serves as a ready energy source for the fungus cells while the phospholipid serves as an enzyme activator for the cell. Each of these materials cause the mushroom cell to synthesize lipases (lipid-specific enzymes) in order to assimilate the materials. These lipases are also valuable in breaking down other food stuffs available to the fungus within the compost or other growth medium. By inducing the cells to construct the lipases the growth of the cells is thus significantly enhanced.

The protein layer 22 is predominantly made up of an activated (as opposed to denatured) protein concentrate, thus is more readily assimilable than denatured protein. The preferred protein material is a soy protein concentrate derived from soy bean meal. The protein is a structurally utilizable nutrient to the fungus cell.

Also entrapped and contained within the protein layer 22 are smaller amounts of specific growth activator materials. The activator materials utilized in the preferred embodiment are calcium caseinate and sodium acetate. The calcium caseinate and sodium acetate are normally present in considerably lower total concentration than the soy protein concentrate. Each of these materials has been found, in these concentrations, to stimulate growth in mushroom cells by activating or catalyzing enzyme synthesis and/or other cell growth processes.

The protein layer 22 will also ordinarily contain a small concentration of water. The water helps to solublize the protein concentrate and to ionize the calcium caseinate and sodium acetate such that their activation properties are maximized. This helps the mushroom mycelia to more efficiently utilize the nutrient content of the enhancer droplets 14.

A preferred enhancer droplet 14 has a dry weight concentrate of materials as follows:

TABLE 1

| INGREDIENT | WEIGHT % |
| --- | --- |
| Soy Protein Concentrate | 46.7 |
| Calcium Caseinate | 5.6 |
| Sodium Acetate | 2.6 |
| Soy and/or Cottonseed Oil | 43.9 |
| Lecithin | 1.3 |

The enhancer droplets have a typical radius of approximately one hundred to one hundred and fifty microns (100-150).

The conglomerate nutrient particle 10 has an approximate radius of $2.0 \times 10^{-2}$ cm to $7.6 \times 10^{-2}$ cm (65 Tyler mesh to 18 Tyler mesh). The preferred weight ratio of matrix particles 12 to enhancer droplets 14 is approximately 11.2:1. The final moisture content of the conglomerate particle is approximately seven percent (7%). The bulk density of the product is approximately 0.56 g/cm$^3$ (35 lb/ft$^3$).

A preferred method for preparing a nutrient, in particle form, for use in fungus growth is illustrated in FIG. 3. The method illustrated in FIG. 3 will result in the production of conglomerate particles such as the conglomerate nutrient particle 10 illustrated in FIG. 1.

The method of the invention utilizes five types of starting materials. These materials are combined in step a. in an appropriate container. The materials utilized are a fatty oil material such as vegetable oil, a protein material such as soy protein concentrate, a phospholipid material such as lecithin, enzyme stimulators such as sodium acetate and calcium caseinate, and water (H$_2$O). These component materials are the materials which make up enhancer droplets such as the one illustrated in FIG. 2, and have the characteristics described above.

A typical batch will include combining the materials in amounts as follows:

TABLE 2

| INGREDIENTS | AMOUNT | |
| --- | --- | --- |
| | Kilograms (kg) | Pounds |
| Soy Protein Concentrate | 45.4 | 100 |
| Calcium Caseinate | 5.4 | 12 |
| Sodium Acetate | 2.5 | 5.5 |
| Soy and/or Cottonseed Oil | 42.6 | 94 |
| Lecithin | 1.2 | 2.7 |
| Water | Variable | Variable |

The combined component materials are then, in step b., homogenized to form microencapsulated enhancer droplets. The homogenation is accomplished in a high pressure homogenizer of standard commercial design. The homogenizing process causes the non-polar, immiscible materials, the fatty oil and the phospholipid, to form into small droplets which are microencapsulated by a layer of the polar materials such as the protein, the water and the enzyme stimulators. The enhancer droplets which result from the homogenzing step b., are spherical in shape and have a preferrable radius of approximately one hundred to one-hundred-fifty microns (100-150). In a dual stage type of homogenizer this particle size may be obtained by using 500 psig on the first stage and 1500 psig on the second stage.

The enhancer droplets formed in step b, are then blended in a ribbon blender with a quantity of matrix particles. The matrix particles are an anhydrous matrix material being preferably a denatured soy protein by-product as described above. The matrix material is in the form of irregular particles having convoluted surfaces with recessed attachment positions for receiving the enhancer droplets. During the blending step a plurality of enhancer droplets will become attached to each matrix particle.

The blending step is accomplished in a commercial ribbon blender. The weight ratio of matrix material to enhancer droplets is approximately 11.2:1. For the batch described in Table 2 the amount of matrix material would be approximately 1089 kg (2400 lb). Approximately 136 kg (300 lb) of additional water is also added at this stage to facilitate blending.

The slurry of conglomerate particles formed in step c. is denatured in step d. This partial denaturization is accomplished by adding a formaldehyde solution to the ribbon blender. The action of the formaldehyde upon the proteins which predominantly make up the structure of the conglomerate material results in denaturing the protein material. The tertiary structure of the proteins is altered by the formaldehyde such that the protein is more difficult for fungus mycelia to breakdown and assimilate. The preferred amount of formaldehyde added to the conglomerate particle slurry for the batch of Table 2 is approximately 3.18 kg (7 lb.) and the preferred reaction time is approximately twenty-four hours.

The denatured conglomerate particles of step d., are then, in step e., dried into the final product. At the end of step d. the moisture content of the conglomerate particles is approximately eighteen percent (18%) by weight. In the preferred method the conglomerate particles are then dried in a fluid bed dryer at approximately 60° to 77° C. (140° to 170° F.) for approximately three minutes. The resultant product has a moisture content of about seven percent (7%). The heat of the drying step further denatures the matrix material such that the homogenate enhancer droplets are entrapped within the matrix material particles.

After drying the nutrient particles are ready for use.

INDUSTRIAL APPLICABILITY

The nutrient particles of the present invention are of significant value in the commercial mushroom growing industry. The nutrient particles, as an additive to the growth medium for edible mushrooms, have been found to increase yields.

In utilization, the nutrient particles are typically dispersed throughout the compost which provides the growth medium for most commercial mushrooms. This dispersal may be accomplished at the same time that the mushroom spawn is being dispersed in the compost. It has been found that a ratio of approximately 7% nutrient relative to the dry weight of mushroom compost leads to best results. Under these circumstances and otherwise normal growing conditions it has been found that the output of a bed containing the nutrient of the present invention is as much as thirty percent greater than that of an identical bed not treated with the nutrient. These results have been observed by the inventor in testing at a commercial mushroom farm in Watsonville, Calif.

The nutrient particles of the present invention are of particular value in mushroom growing in that the exterior portion of the nutrient particles is denatured and relatively inaccessible to the mushroom mycelia during the early growth stages. The mushroom spawn will initially exhaust the nutritional value of the grain kernel upon which it is grown and then begin to seek nutrition in the compost surrounding it. After a period of approximately seven to eight days from planting, the mycelia reach sufficient vitality that they are capable of breaking down the denatured protein of the matrix material and assimilating that protein as a structural nutrient. The structural nutrient such as is found in the matrix material is particularly valuable in the overall fungus growth and particularly in the actual mushroom fruit which is the ultimate result of the crop.

Once the mycelia have succeeded in breaking down the matrix material, and consequently the formyl bridges, they are then able to obtain access to the enhancer droplets which are entrapped in the matrix particle. The enhancer droplets provide readily assimilable and high nutritional value protein and fatty oils to the mycelia, thus rapidly increasing the growth. The enhancer droplets further provide growth and enzyme stimulators in the form of the sodium acetate, the calcium caseinate and the lecithin which enable the fungus to more readily attack other nutrients to be found within the compost. These stimulators activate the mycelia and greatly enhance their growth characteristics. The various enhancer droplets provide periodic biological stimulation to the mature mycelia which maintain the mycelia at an accelerated growth rate throughout the crop stage. The overall result is a greater utilization of the nutrients contained within the compost and a larger crop of mushrooms per given area.

The various components of the particles of the preferred invention have been described in terms of readily available and inexpensive materials. Those skilled in the art will recognize that fatty oils other than soy bean and cottonseed oil may be utilized and that phospholipids other than lecithin will serve equally well. It will further be recognized that protein concentrates other than soy protein, acetate salts other than sodium acetate and caseinates other than calcium caseinate may be substituted with similar results. Additional growth stimulators such as various vitamins may also be added to enhance the mushroom growth.

The various steps of the method for preparing the nutrient particles may be varied slightly without materially affecting the result. Furthermore, the specific ingredients and ratios utilized in the method may be altered to accomplish specific desired purposes.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An improved nutrient for fungus growth, in particle form, comprising:
   a matrix particle of anhydrous denatured protein material; and
   a plurality of growth enhancer droplets smaller in size relative to the matrix particle and having a core of fungus growth stimulating materials microencapsulated by an activated protein outer shell, said droplets being attached to the matrix particle such that the droplets are available only to those mycelia having sufficient maturity and vitality to break down and utilize the protein of the matrix particle.

2. The improved nutrient of claim 1 wherein, the matrix particle is irregularly shaped and includes a plurality of recessed attachment positions for receiving the growth enhancer droplets.

3. The improved nutrient of claim 1 wherein, the matrix material includes soy meal from which oils and polar-solvent soluble contents have been substantially removed.

4. The improved nutrient of claim 1 wherein, each growth enhancer droplet is generally spherical in shape, having an inner core including fatty oil and phospholipid material and an outer shell including enzyme stimulator materials and generally activated protein concentrate.

5. The improved nutrient of claim 4 wherein said fatty oil is vegetable oil and said phospholipid material is primarily lecithin.

6. The improved nutrient of claim 4 wherein, said enzyme stimulator materials include calcium caseinate and sodium acetate, and said protein concentrate is soy protein concentrate.

7. The improved nutrient of claim 2 wherein, the growth enhancer droplets are bonded to the matrix particle at said recessed attachment positions so as to be relatively inaccessible to the fungus mycelia while the matrix particle remains substantially intact.

8. The improved nutrient of claim 7 wherein, the matrix particle is further denatured subsequent to the attachment of the growth enhancer droplets such that the matrix particle contracts about said recessed attachment positions to substantially limit mycelium access to the growth enhancer droplets.

9. The improved nutrient of claim 8 wherein, the matrix particle is further denatured so as to cause a plurality of chemical bridges to form over said recessed attachment positions to further limit mycelium access to the growth enhancer droplets.

* * * * *